Sept. 5, 1933.　　　T. E. MURRAY, JR., ET AL　　　1,925,272
METER INSTALLATION
Filed Feb. 18, 1929　　　2 Sheets-Sheet 2
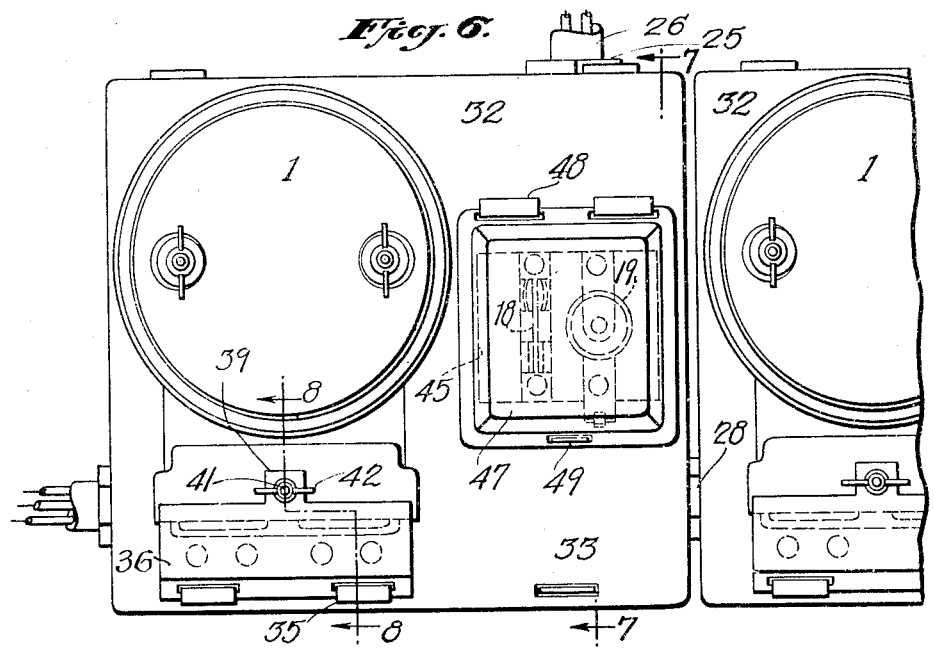
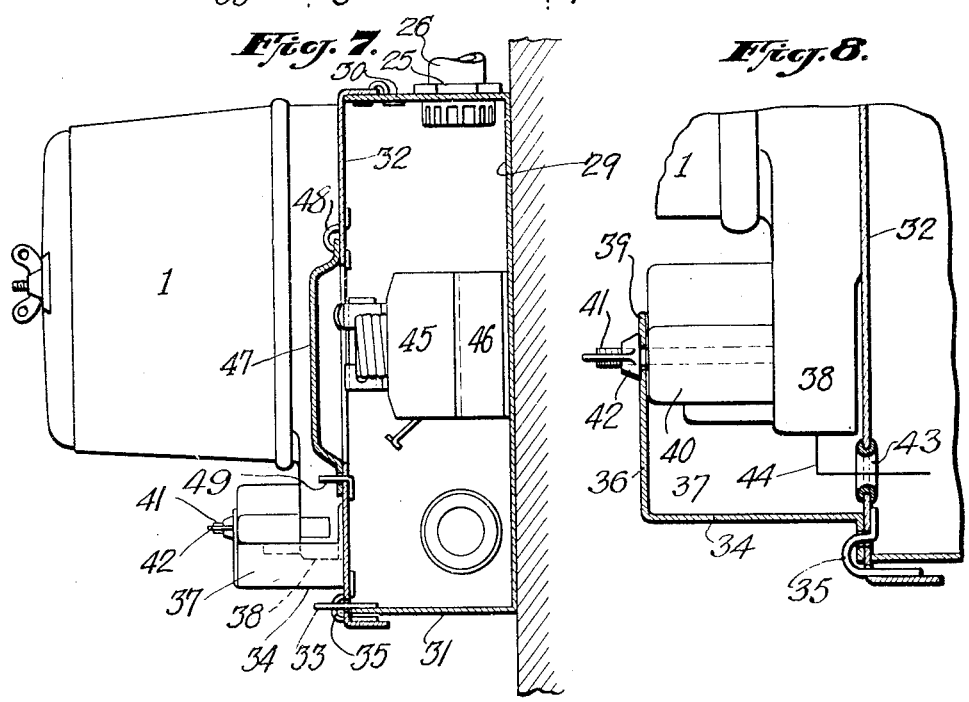
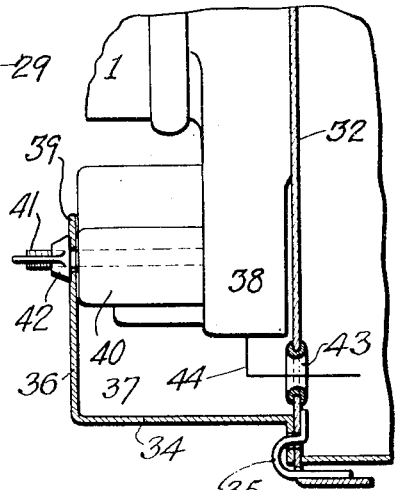
Inventors
Thomas E. Murray Jr
Albert B. Rypinski.
By their Attorneys Patented Sept. 5, 1933

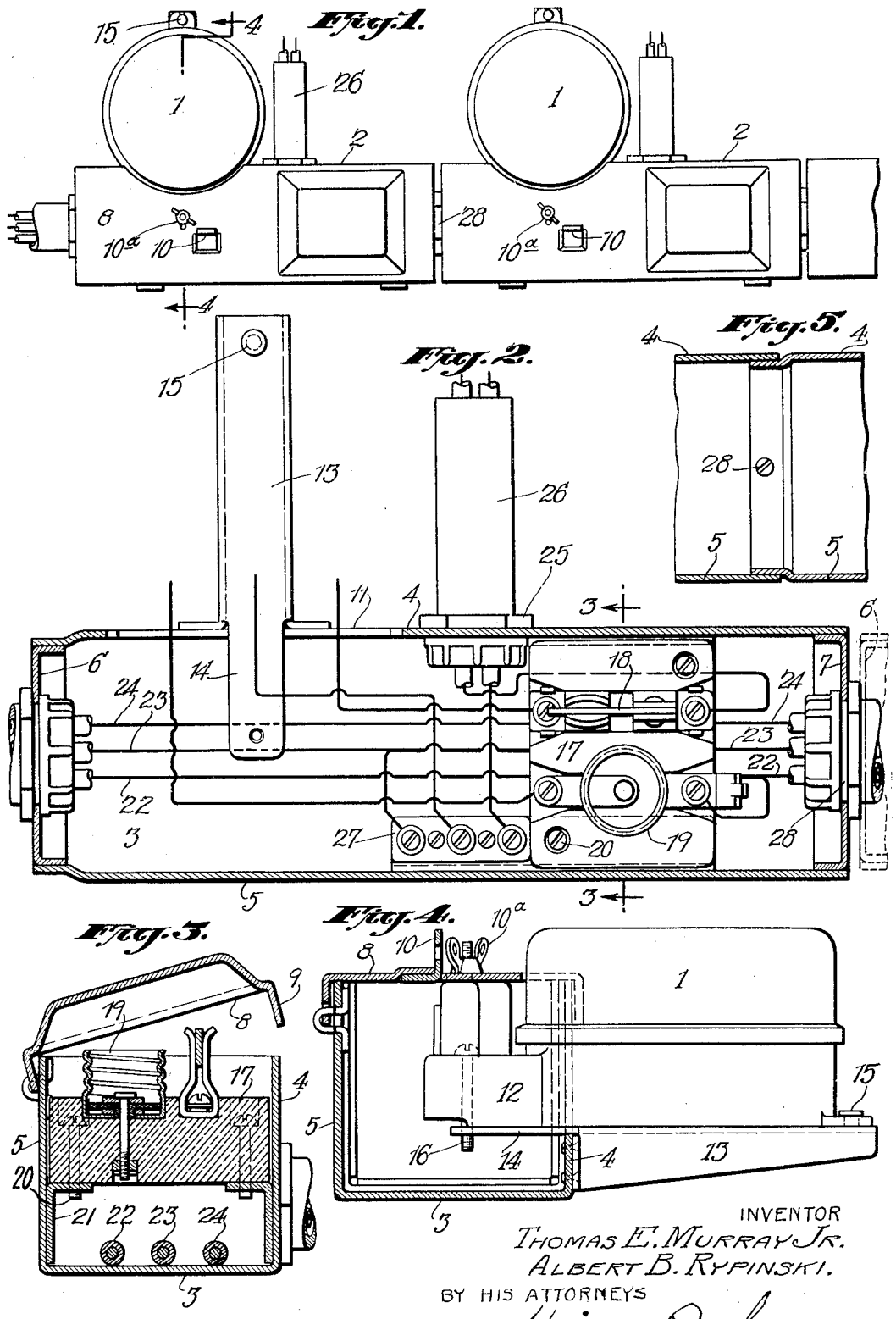

1,925,272

UNITED STATES PATENT OFFICE 1,925,272

METER INSTALLATION

Thomas E. Murray, Jr., Brooklyn, and Albert B. Rypinski, Laurelton, Long Island, N. Y., assignors, by direct and mesne assignments, to Metropolitan Device Corporation, a corporation of New York Application February 18, 1929. Serial No. 340,744

8 Claims. (Cl. 247—2)

The invention aims to provide a meter box and an arrangement of meters and boxes designed chiefly to save space, and having other advantages referred to in detail hereinafter.

The accompanying drawings illustrate embodiments of the invention.

Fig. 1 is an elevation of meters and boxes installed;

Fig. 2 is a vertical section of a box, showing the parts within in elevation;

Fig. 3 is a cross-section on the line 3—3 of Fig. 2;

Fig. 4 is a section approximately on the line 4—4 of Fig. 1;

Fig. 5 is a vertical section of a modification;

Fig. 6 is an elevation of another style of box and Fig. 7 a vertical section thereof on the line 7—7;

Fig. 8 is a section on the line 8—8 of Fig. 6.

For apartment houses and similar buildings it is customary to mount the meters leading to the separate apartments or load circuits with a certain lateral space between them. In many cases there is considerable lateral space available but it is important to use the least vertical space possible.

The present invention is designed to utilize the lateral spacing between the meters in such a way as to permit a reduction of the usual vertical space occupied.

Referring first to Figs. 1 to 5, the electric meters 1 are mounted on certain supports attached to or forming part of boxes or troughs 2, generally called "cutout" boxes and serving to carry switches, fuses and other controlling or testing devices connected to the meter circuit in various arrangements. Each box has a back wall 3, horizontal top and bottom walls 4 and 5 and vertical end walls 6 and 7. A cover 8 is hinged to the bottom wall and has a flange 9 fitting over the top wall. A slotted fixture 10 extends upward from the cover for attachment by a sealing wire to a thumb nut 10ª by which the cover is held down.

Each box has an opening 11 through its top wall 4 large enough to admit a considerable part of the meter casing and at least the part 12 (Fig. 4) which carries the meter terminals and is generally in the form of a meter terminal chamber. The edges of the opening in the box wall are cut to fit the contour of the meter casing, and the cover 10 has its upper flange and edge cut away to fit the upper part of the meter casing and, with the wall, 4 to completely enclose the meter terminals and connections against access.

The opening 11 into the box may be shaped to accommodate any desired part of the meter casing, and thus to permit the entrance of the meter casing to a greater or less extent into the box. Most meters of the present time have a terminal chamber the end of which is of standard shape. By shaping the opening 11, to accommodate only this small standard end of the meter casing, the box is made widely interchangeable with meters of different makes and styles. For a particular meter, however, the opening may be so shaped as to permit a larger part of the meter casing to enter the box, as illustrated in Fig. 4, and thus to effect a greater economy of vertical space.

The meter is supported in this position on a bracket 13 riveted to the box and having its floor 14 spaced well forward of the back 3 of the box and projecting well into the box. The box is mounted on a wall by screws through its back wall or other usual or suitable means and the meter is then mounted by slipping its bifurcated lug up over the shank of the stud 15 carried by the bracket and fastening its lower end (within the box) by a screw 16.

Carried within the box at a point laterally beyond the meter terminal chamber 12 and in line therewith is a porcelain base 17 extending clear across the vertical width of the box and carrying a switch 18 and a fuse case 19 and binding screws and meter test connections. The base is spaced away from the back of the box, being fastened by screws 20 on the flanges of angles 21 welded to the walls 4 and 5. The forward position of the meter supporting floor 14 and the base 17 leaves room at the back of the box for the supply wires 22, 23 and 24 to pass in substantially horizontal alignment with the controlling devices. The total vertical space occupied by the box is therefore only that which is necessary to carry the controlling devices and their base 17.

In vertical line with the space between the meters and between the meter terminal chamber and the block 17, the upper wall 4 of the box has an opening in which is fitted a bushing 25 and an outlet conduit 26 for the load wires. Opposite this conduit, mounted on one of the angles 21 is a connection block 27 with binding screws for the appropriate supply, meter and load wires.

Each box extends laterally substantially to the next box and is connected thereto by a bushing 28 extending through the walls 6 and 7 and having clamping nuts on its ends; the supply wires passing through the bushing from one box to the next.

The relative positions of the base 17, the outlet 26 and the block 27 may be varied, but it is best to arrange all such parts at one side of the opening 11 so as to leave the full vertical width of the box clear at this point for "finger room" in connecting the wires. The end 7 of the box which carries the base 17 is of the full height, but the opposite end 6 may be of somewhat less height.

The box is shown of its full vertical width clear to the right end. The left end however is reduced by an amount equal to the thickness of the walls. In some cases it is not essential to have each box forming a separate and complete closure of the wires and controlling devices therein; there being no objection to leaving communication open from one box to the next. In that case the end plates 6 and 7 may be omitted and the walls of one box fitted over the end of the next as in Fig. 5 and the two boxes fastened together by a screw 28 operated from within the boxes.

The drawings show a single cutout for controlling the current supply to the meter and a single circuit. It is sometimes desirable to bring a number of branch (load) circuits to the meter and control them all from devices mounted in the meter box. In this case the single cutout would be replaced by two or more separate cutouts or a combination block. The cover over the meter control block would ordinarily be one unit and sealable while the cover over the load circuit controlling block or blocks would ordinarily be another unit and not sealed. The separaton may be carried still farther and the supply wires ahead of the meter be carried in a sealed compartment divided off from the load wires after the meter. In this case the cover over the former wires would be sealed while the cover over the latter wires would not. The purpose of this separation is to prevent theft of unmetered current.

Figs. 6 and 7 show the meter mounted on the cover of the box and this, within a given vertical and lateral space, gives extra wiring rooom. It is, therefore, particularly useful where a number of branch load circuits join in the box.

The box has a base 29 fastened on the wall or other vertical support and has top and bottom horizontal walls 30 and 31 and a main cover 32 hinged on the top wall and flanged over the bottom wall. A sealing post 33 is fixed to the bottom wall and extends through a slot in the cover 32.

On the lower part of the main cover 32 is a supplementary cover or box having a bottom wall 34 fastened by hinges 35 at its rear edge, a front wall 36 and end walls 37 with an open space at the top adapted to be filled by the end 38 of the meter terminal chamber. The front wall 36 has an upwardly projecting flange 39 overlying the cap 40 of the meter terminal chamber.

The usual sealing post 41 for the terminal chamber cap projects through the extension 39 and carries the thumb nut 42 on its end, (the end of the stud being slotted as usual to seal the nut down). The cover 32 has a number of bushed openings 43 through which the wires 44 pass between the meter and the interior of the box.

The base 45, which carries the controlling devices, is carried on supports 46 so as to leave space for wires between said base and the back of the box, in a manner similar to that shown in Fig. 3. These parts, therefore, are laterally beyond the meter, but are not in line with the terminal chamber thereof. The box, in fact, extends to the full height of the meter casing, so that controlling devices may be carried at various elevations without varying the total space occupied. An auxiliary cover 47 is preferably used for the controlling devices. It is fastened at its upper edge by hinges 48 to the main cover 32 and slotted at its lower edge to pass over a sealing post 49.

In this construction the meter casing takes up none of the space inside of the box and there is all the more room left for circuit connecting and controlling devices.

The boxes may be made originally with knockouts in place of the several openings described, both for the entrance of the meter casing and for the passage of wires; and in referring to "openings" in the walls of the box, we include such openings whether complete or temporarily covered by knock-outs.

Various modifications may be made without departing from the invention as defined in the following claims:

1. An installation including in combination electric meters mounted with lateral spaces between them, boxes each containing all the controlling devices for the current supply to one of said meters and each adapted to be separately locked, the casing of each meter having a portion which carries the meter terminals, each box having a wall with an opening through which the meter casing extends with the meter terminals lying within the box and the body of the meter lying outside and each box extending laterally beyond its meter to the next box and carrying all of said controlling devices at a point laterally beyond the vertical lines through said terminals, so that the installation occupies only the vertical space required to accommodate the meters and their connections.

2. An installation including in combination electric meters mounted with lateral spaces between them, boxes each containing all the controlling devices for the current supply to one of said meters and each adapted to be separately locked, the casing of each meter having a portion which carries the meter terminals, each box having a wall with an opening through which the meter casing extends with the meter terminals lying within the box and the body of the meter lying outside and each box extending laterally beyond its meter to the next box and carrying all of said controlling devices at a point in horizontal alignment with said terminals, so that the installation occupies only the vertical space required to accommodate the meters and their connections.

3. An installation including in combination electric meters mounted with lateral spaces between them, boxes each containing all the controlling devices for the current supply to one of said meters and each adapted to be separately locked, the casing of each meter having a portion which carries the meter terminals, each box having a wall with an opening through which the meter casing extends with the meter terminals lying within the box and the body of the meter lying outside and each box extending laterally beyond its meter to the next box and carrying offset laterally from said terminals all of said controlling devices and also an outlet for load wires, so that the installation occupies only the vertical space required to accommodate the meters and their connections.

4. An installation including in combination electric meters mounted with lateral spaces between them, boxes each containing all the controlling devices for the current supply to one of said meters and each adapted to be separately locked, the casing of each meter having a portion which carries the meter terminals, each box having a wall with an opening through which the meter casing extends with the meter terminals lying within the box and the body of the meter lying outside and each box extending laterally beyond its meter to the next box and carrying in line with the space between the meters all of said controlling devices and also an outlet for load wires, so that the installation occupies only the vertical space required to accommodate the meters and their connections.

5. An installation including in combination electric meters mounted with lateral spaces between them, boxes each containing all the controlling devices for the current supply to one of said meters and each adapted to be separately locked, the casing of each meter having a portion which carries the meter terminals, each box having a wall with an opening through which the meter casing extends with the meter terminals lying within the box and the body of the meter lying outside and each box extending laterally beyond its meter to the next box and carrying offset laterally from said terminals a connection block for the supply and load lines, an outlet for the load wires and all of said controlling devices, so that the installation occupies only the vertical space required to accommodate its meters and their connections.

6. A box for electric meters having an opening in one of its walls adapted to admit the insertion of the meter terminals into the box, in combination with controlling devices for the current supply to the meter and for the current distribution from the meter, all of said controlling devices being carried within said box and located at one side of said opening, so that the box occupies only the vertical space required to accommodate the meter terminals and their connections.

7. The combination with a box, of an electric meter having a casing with a terminal chamber, said casing passing through one wall of the box with its terminal chamber enclosed within the box so as to be accessible only when the box is open, said box having a clear finger space extending from the end of the terminal chamber to the opposite wall of the box for manipulating the connections to the meter terminals and devices connected to the meter circuits and carried in said box alongside of said terminal chamber and said finger space and a bracket supporting the meter casing and extending into the box and spaced forward from the back of the box so as to have a space behind it for the passage of conductors.

8. An installation including in combination electric meters mounted with lateral spaces between them, boxes each containing all the controlling devices for one of said meters and each adapted to be separately locked, each box extending laterally beyond its meter to the next box and carrying its meter terminals and carrying all of said controlling devices at a point laterally beyond the vertical lines through said terminals, so that the installation occupies only the vertical space required to accommodate the meters and their connections, said boxes having connecting provisions at their ends to form a practically continuous trough for the supply wires.

THOMAS E. MURRAY, JR.
ALBERT B. RYPINSKI.